United States Patent [19]

Maleci et al.

[11] Patent Number: 4,594,019

[45] Date of Patent: Jun. 10, 1986

[54] DEVICE FOR CONNECTING AN UPRIGHT AND A HORIZONTAL MEMBER IN A TUBULAR METAL SCAFFOLD FOR A BUILDING

[75] Inventors: Guglielmo Maleci; Tullio Latini, both of Milan, Italy

[73] Assignee: FAP Praticus S.p.A., Graffignana Lodigiana, Italy

[21] Appl. No.: 683,190

[22] Filed: Dec. 18, 1984

[30] Foreign Application Priority Data

Dec. 19, 1983 [IT] Italy .................................. 24238 A/83

[51] Int. Cl.⁴ .................................................. F16B 7/00
[52] U.S. Cl. ..................................... 403/246; 403/49; 182/179; 211/182
[58] Field of Search ................... 403/49, 246; 182/179; 211/182, 192

[56] References Cited

U.S. PATENT DOCUMENTS 3,420,557 1/1969 Francis et al. .................. 182/179 X
4,083,640 4/1978 Lovering .............................. 403/246

FOREIGN PATENT DOCUMENTS 1427147 3/1976 United Kingdom ................. 403/49

Primary Examiner—Andrew V. Kundrat
Attorney, Agent, or Firm—Fleit, Jacobson, Cohn & Price

[57] ABSTRACT

A device for connecting a tubular horizontal member to a tubular upright in a scaffold for building, in which the horizontal member engages, by means of a fork, a tenon provided laterally on the upright, while a mutually parallel bolt and wedge extended through the fork and tenon to lock the fork on the tenon.

2 Claims, 3 Drawing Figures

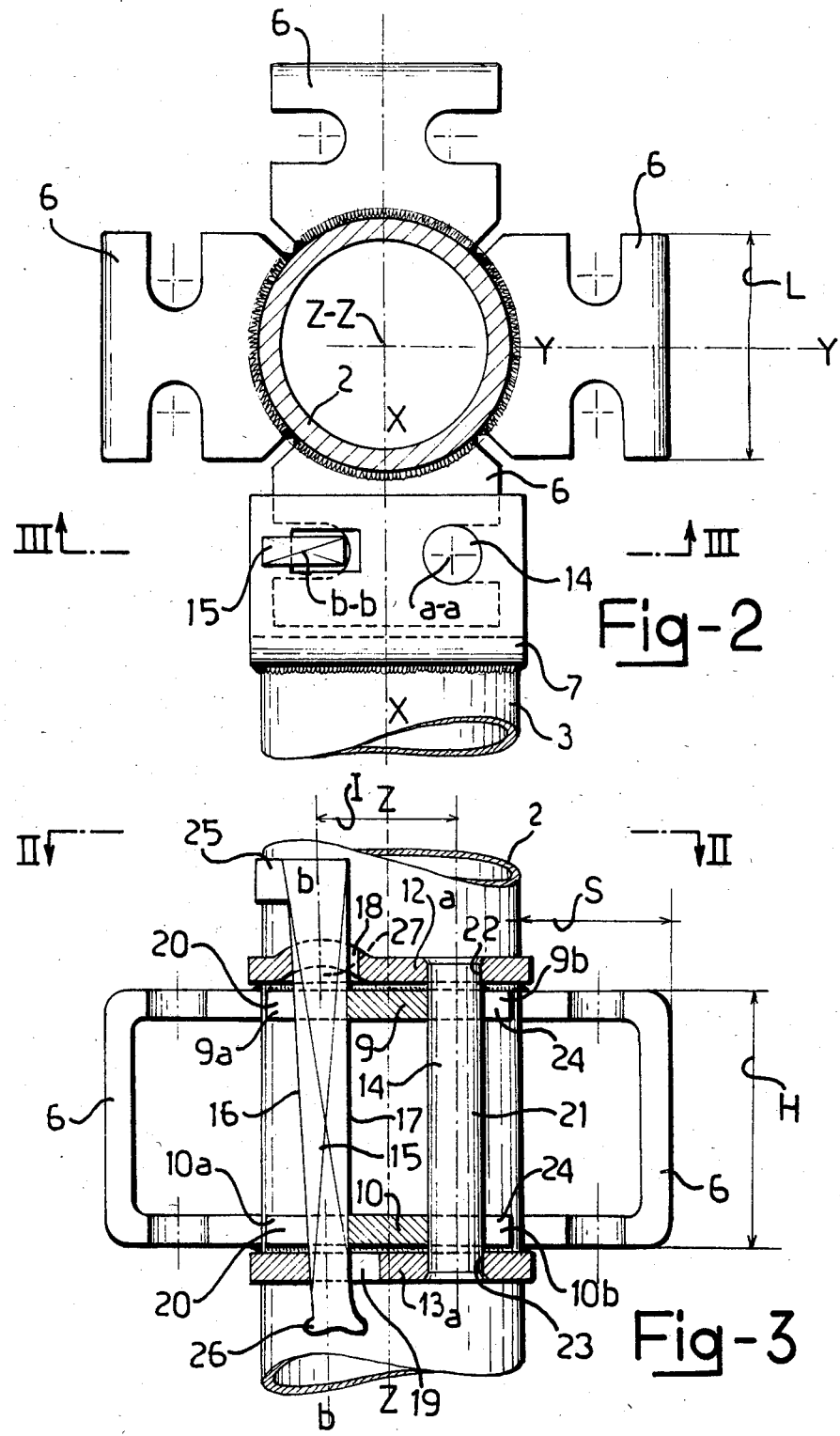

DEVICE FOR CONNECTING AN UPRIGHT AND A HORIZONTAL MEMBER IN A TUBULAR METAL SCAFFOLD FOR A BUILDING

The present invention relates to a device for connecting an upright and a horizontal member in a tubular metal scaffold for building.

As is known, tubular scaffolding for building is formed by a plurality of uprights of vertical metal tubes and a plurality of members, generally metal tubes, extending horizontally between the uprights.

Appropriate connecting devices are provided to connect the uprights and horizontal members together.

In these connecting devices there is a conflict between two contrasting requirements.

On the one hand, they must ensure a rigid connection between the horizontal member and the upright, resembling as closely as possible a fixed joint effective in a vertical or horizontal plane. In this way, once it is set up, the scaffolding is free from vibration and offers maximum stability.

On the other hand, these connecting devices should permit rapid assembly and dismantling. In this way, it is possible to limit the time necessary for putting up the scaffolding and for its removal, with evident advantages of a practical and economic nature.

The known devices currently in use leave something to be desired, as regards at least one of the above two requirements.

For example, those devices formed by half-shells which are closed on the upright and the end of the horizontal member and clamped thereon by tie-bolts ensure good rigidity but are rather complicated to handle, requiring the use of specific tools, and comprise a large number of loose parts.

Another known connecting device incorporates opposing cups formed on the upright and movable towards each other to clamp between them the end of a horizontal member, which is T-shaped for this purpose. This solution enables rapid putting together, while constituting a fixed joint which is satisfactory in the vertical plane but less satisfactory in the horizontal plane. Moreover, the cost of this device is centered particularly on its part associated with the upright rather than with the horizontal member, with a consequently greater overall cost for the scaffolding.

The problem behind the present invention is that of devising a connecting device of the type specified, which has structural and functional characteristics such as to satisfy the aforementioned requirements, simultaneously overcoming the disadvantages cited with reference to the prior art, and in particular to present a high degree of rigidity in all directions and, at the same time, allow rapid assembly and dismantling.

This problem is solved by means of a device of the type specified, which is characterized in that it comprises a forked joint having a tenon fixed to the upright and a fork fixed to the horizontal member, which engage each other with a male and female coupling, and a bolt and a wedge which are essentially parallel to each other and extend through the fork and the tenon to lock the fork on the tenon.

To advantage, the wedge is removable and the bolt is a pin which is fixed in the fork in a lateral position and engages a groove in the tenon against the action of the wedge.

Further characteristics and advantages of the device according to the present invention will become apparent from the following description of one of its preferred embodiments, given purely by way of indicative and non-limiting example, with reference to the appended drawings, in which:

FIG. 2 is a sectional view of the connecting device of FIG. 1, taken along the line II—II, and FIG. 3 is a sectional view of the connecting device of FIG. 1, taken along the line III—III.

Figure 1:
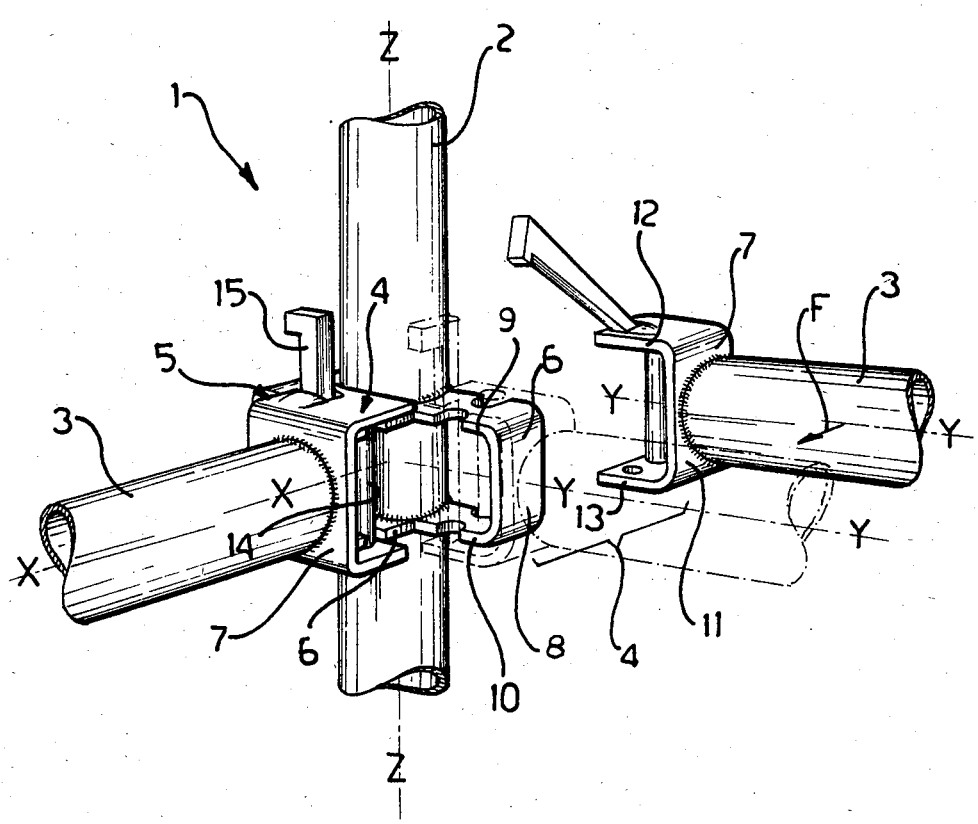
FIG. 1 is a perspective view of a detail of a tubular metal scaffold for building, incorporating a device for connecting an upright and a horizontal member according to the present invention.

With reference to the appended drawings, a part of a tubular metal scaffold is generally indicated 1.

This comprises an upright 2 and two horizontal members, both indicated 3, of which one is shown already connected to the upright 2 and the other about to be connected to the upright 2 by means of respective connecting devices according to the invention, both indicated 4.

In the example illustrated, the upright 2, which has a vertical axis Z—Z, and the horizontal members 3, which nave coplanar and mutually perpendicular horizontal axes, indicated X—X and Y—Y respectively, are made from steel tubing; in the example illustrated these tubes all have the same diameter.

In FIG. 1, the horizontal member 3 about to be connected, which has the axis Y—Y, is shown by a continuous line in the position in which it is not yet connected to the upright, and by a chain line in its position of connection to the upright.

The connecting device 4 for the horizontal member 3 with the axis Y—Y is thus shown with its parts separated, while the connecting device 4 for the horizontal member 3 with the axis X—X is shown with its parts operatively coupled.

Each connecting device 4 according to the invention comprises a forked joint 5 having a tenon 6 fixed laterally to the upright 2 and a fork 7 fixed by its head to the horizontal member 3, which engage each other with a male and female coupling.

In particular, the tenon 6, which projects from the upright by a limited extent S, has a height H in the direction of the axis Z—Z while, in a tangential direction relative to the upright 2, it has a width L substantially equal to the tube diameter.

In its construction, the tenon 6 has the form of a U-shaped element, the arms 9, 10 of which have a length S and a width L, and the base 8 of which has the length H. This element is welded to the upright 2 at the free ends of the arms 9 and 10.

The fork 7 has the form of a U-shaped element, the arms 12, 13 of which have a width substantially equal to L and constitute the prongs of the fork 6, and the base 11 of which is butt welded by its flat surface to the end of the horizontal member 3.

The base 11 and the arms 12, 13 of the U-shaped element constituting the fork 7 fit with limited play onto the base 8 and the arms 9, 10 respectively of the U-shaped element constituting the tenon 6, when the fork 7 and tenon 6 engage each other with a male and female coupling.

For the locking of the fork 7 to the tenon 6, the device 4 according to the invention includes a bolt 14 and a wedge 15 extending through the fork 7 and the tenon 6.

In particular, the bolt 14 and the wedge 15 have respective axes a—a and b—b, which are parallel to each other and to the axis Z—Z and symmetrical relative to the axis of the horizontal member 3. The distance between these axes, indicated I, has a value slightly less than the width L of the tenon 6 and the fork 7.

The axes a—a and b—b define a plane, traced by the line III—III, perpendicular to the axis X—X and extending parallel to the upright 2.

The wedge 15 has opposite active surfaces 16, 17 inclined to each other and extending perpendicular to the plane traced by the line III—III, the active surface facing the bolt 14 being indicated 17.

The wedge 15 extends removably through passages 18, 19 formed in lateral positions in respective prongs 12 and 13 of the fork 7, and through a groove 20 formed laterally in the tenon 6, this groove 20 taking the form of two lateral recesses 9a and 10a formed in the arms 9 and 10.

The bolt 14 is a cylindrical pin, indicated 21, fixed in the fork 7 in a lateral position and having its ends welded in respective holes 22, 23 formed in the prongs 12 and 13.

The cylindrical pin 21 is engaged in a groove 24 formed laterally in the tenon 6, this groove 24 taking the form of two lateral recesses 9b and 10b formed respectively in the arms 9 and 10 opposite the recesses 12a and 13a.

The pin 21 is forcibly engaged in the groove 24 by reaction to the action of the wedge 15 which is, in turn, forcibly inserted into the space between the passages 18 and 19 of the fork 7 and the groove 20 of the tenon 6, the active surfaces 16, 17 of this wedge 15 stressing the fork 7 through the passages 18, 19 and the tenon 6 through the groove 20, respectively, in the plane traced by the line III—III.

To advantage, the wedge 15 has a head 25 at its larger end to allow its removal.

At its smaller end, the wedge 15 has an enlarged part 26 with a section smaller than the passage 19 and greater than the passage 18. The prong 12 of the fork 7 is locally deformed outwardly around the passage 19 to define a recess 27 for receiving the enlarged part 26.

When the wedge 15 is removed, the enlarged part 26 passes freely through the passage 19 but is stopped upstream of the passage 18, remaining lodged in the recess 27. Thus, the wedge 15 is retained in the fork 7 by the enlarged part 26 and cannot be lost.

Referring now to the horizontal member 3 with the axis Y—Y, this is easily connected to the upright by a movement parallel to itself in the direction of the arrow F, until its pin 21 engages the groove 24.

In this condition, the passages 18 and 19 are aligned with the groove 20 and the wedge 15 is forcibly inserted in the space defined thereby.

The desired connection between the horizontal member 3 and the upright 2 is thus achieved.

In an entirely similar manner, but with the process in reverse, the horizontal member 3 is dismantled from the upright 2.

The main advantage of the connecting device of the present invention is that, when it is used, the horizontal member is fixed firmly to the upright with a high degree of rigidity in all directions.

In addition, the connecting device of the invention allows rapid handling, whether it is being set up or dismantled.

It should be noted that it has a simple construction both in the part relating to the horizontal member, comprising the fork, the pin and the wedge, and above all in the part relating to the upright, comprising only the tenon.

Finally, the connecting device according to the invention has no separate or loose parts and cannot itself be lost.

It should also be noted that the connecting device according to the present invention, although described with reference to the connection of an upright of a scaffold to a respective horizontal member, lends itself equally well to the connection of this upright to a diagonal tie, cross tie and the like.

Clearly, in order to meet specific contingent requirements, a person skilled in the art may make numerous modifications and variations to the connecting device described above, all these falling, however, within the scope of protection of the invention as defined in the following claims.

We claim:

1. A device for connecting an upright and a horizontal member in a tubular metal scaffold for building, comprising:
    a forked joint including a tenon fixed to the upright and a fork fixed to the horizontal member, which tenon and fork engage each other to define a male and female coupling when interengaged, and
    a pin and a wedge which are essentially parallel with each other and extend through the fork and tenon to lock the fork on the tenon.

2. A device as defined in claim 1, wherein the wedge is removable, the pin is fixed to the fork in a lateral position, and the tenon defines a groove which is engaged by the pin against the action of the wedge.

* * * * *